Dec. 19, 1922.

A. A. GRINER.
MACHINE FOR MAKING FABRICATED WIRE.
FILED MAY 7, 1921.

1,439,411.

3 SHEETS—SHEET 1.

WITNESSES
J. Herbert Bradley.

INVENTOR
Alvah A. Griner
by Winter & Brown
his attorneys

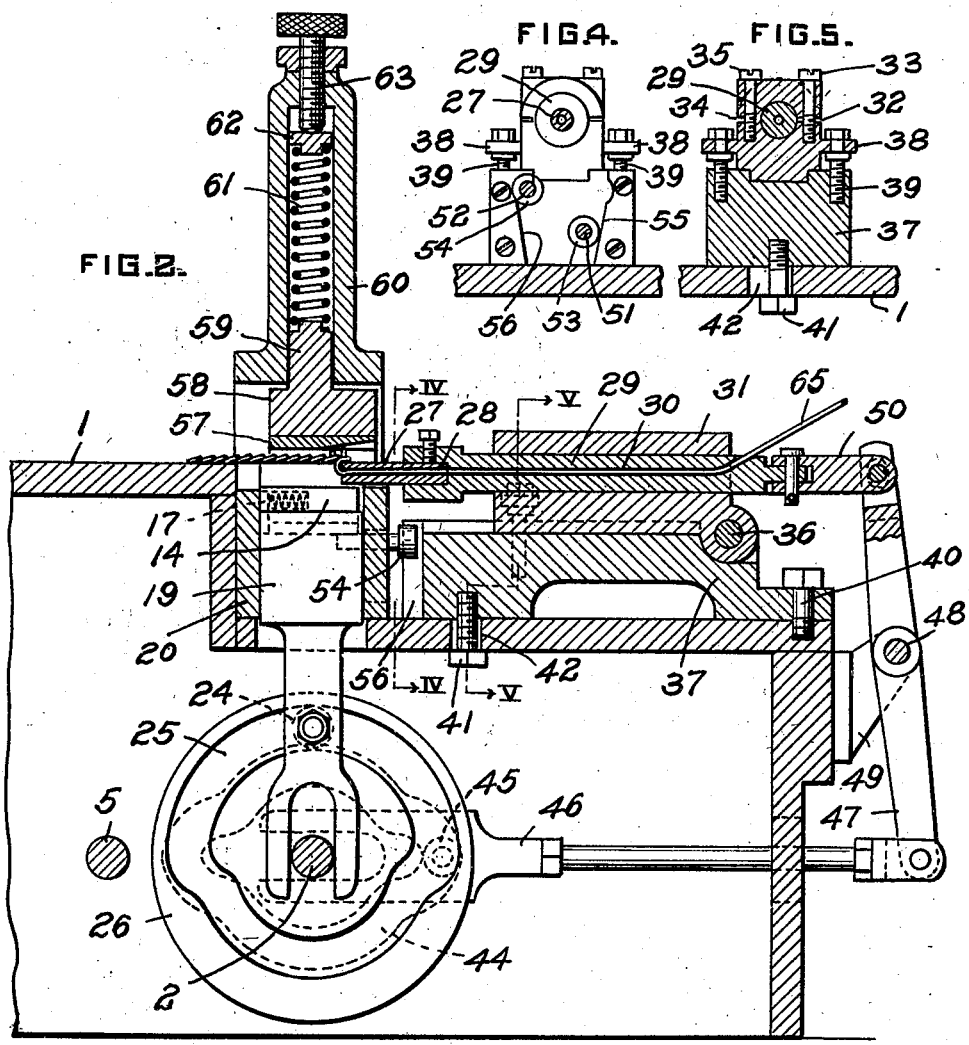
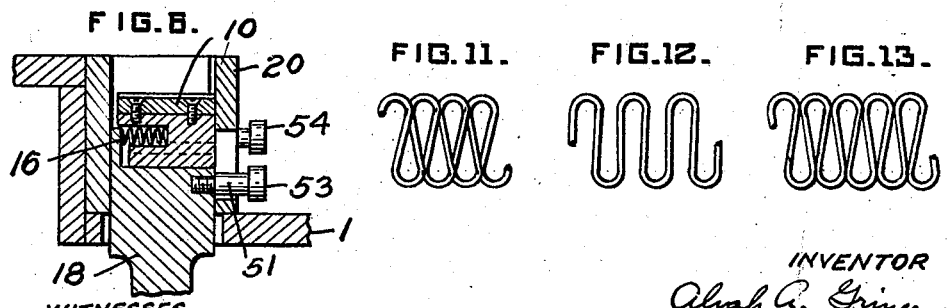

Dec. 19, 1922.
A. A. GRINER.
MACHINE FOR MAKING FABRICATED WIRE.
FILED MAY 7, 1921.
1,439,411.
3 SHEETS—SHEET 3.
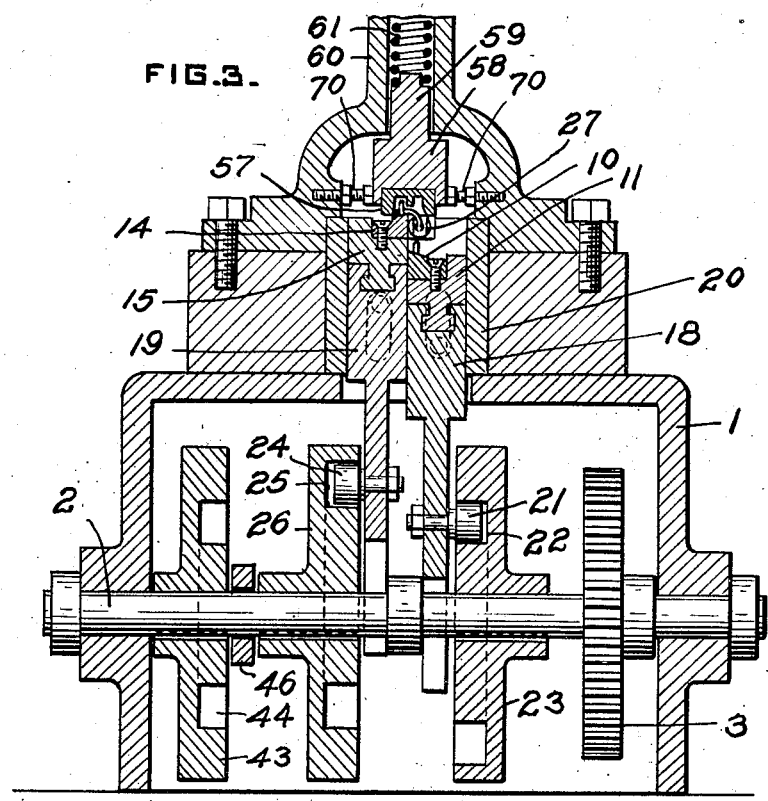
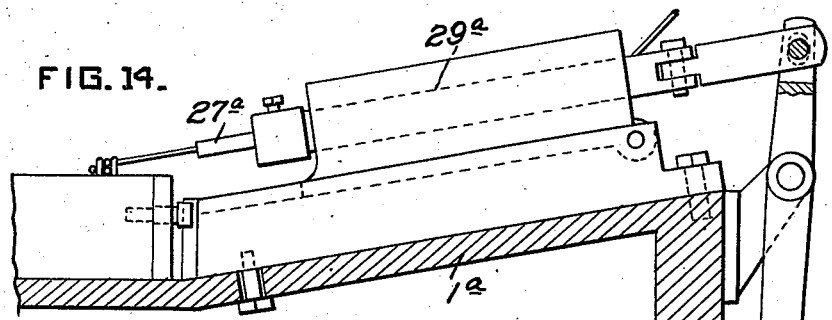
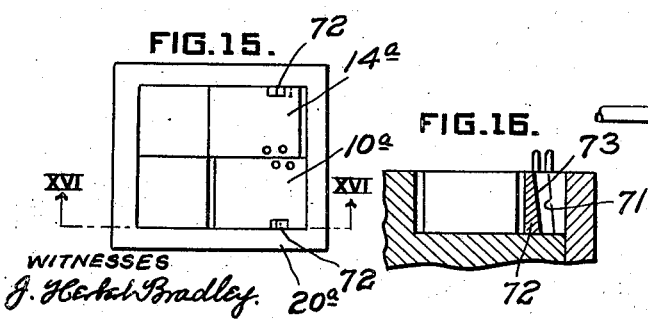
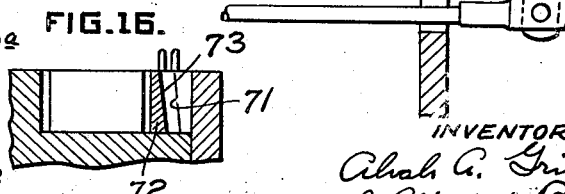

Patented Dec. 19, 1922.

1,439,411

UNITED STATES PATENT OFFICE.

ALVAH A. GRINER, OF BAYSIDE, NEW YORK, ASSIGNOR TO THE SPIRELLA COMPANY, OF MEADVILLE, PENNSYLVANIA, A CORPORATION OF PENNSYLVANIA.

MACHINE FOR MAKING FABRICATED WIRE.

Application filed May 7, 1921. Serial No. 467,685.

*To all whom it may concern:*

Be it known that ALVAH ALONZO GRINER, citizen of the United States, residing at Bayside, Long Island, New York, U. S. A., has invented certain new and useful Improvements in Machines for Making Fabricated Wire, of which the following is a specification.

In my Patent No. 1,327,467, there is disclosed a machine for making fabricated wire or looped wire fabric, particularly such as is used as stays in corsets and like garments. The present invention relates to machines of the same general character, and the object thereof is to improve and simplify their construction and operation.

Figure 1:
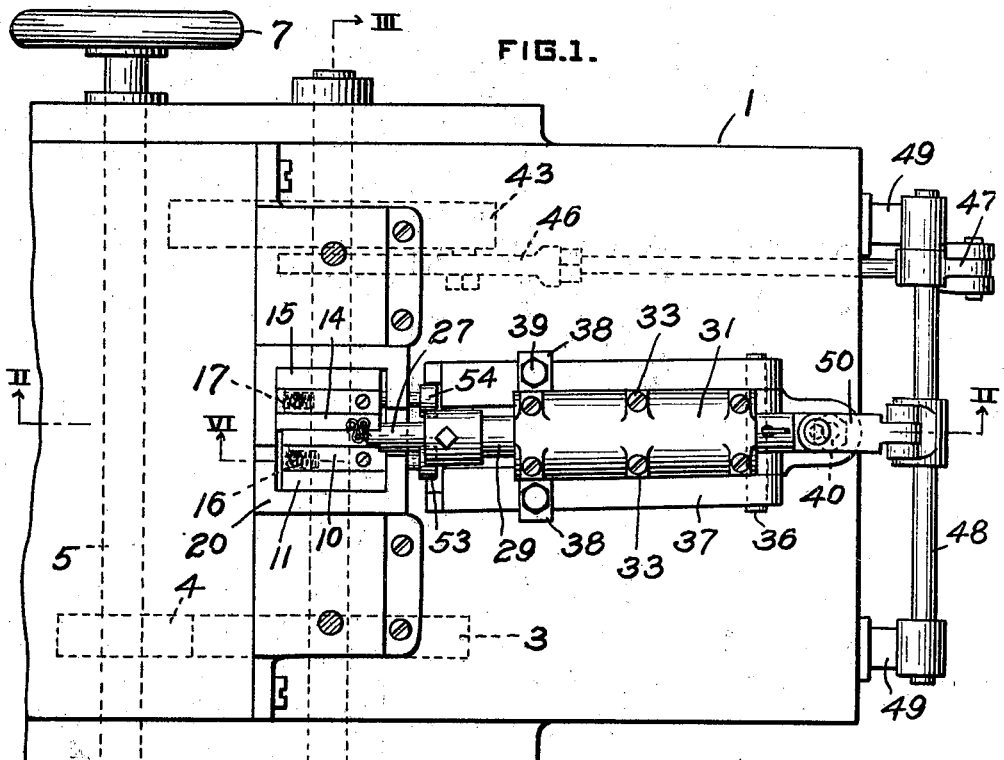
Figures 7, 8, 9:
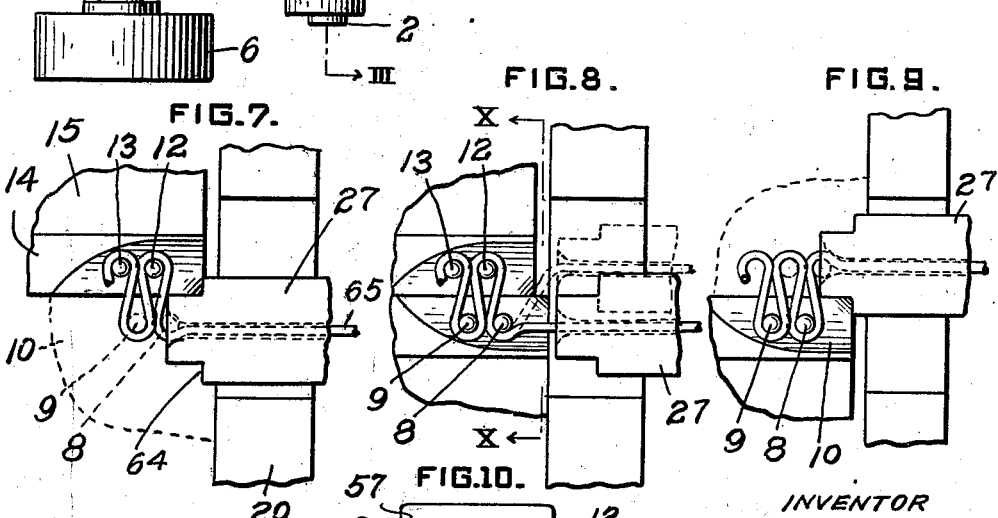
Figure 10:
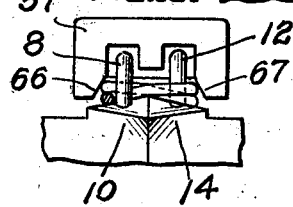

The invention is illustrated in the accompanying sheets of drawings of which Fig. 1 is a plan view of the machine; Fig. 2 a vertical sectional view taken on the line II—II, Fig. 1; Fig. 3 a transverse sectional view taken on the line III—III Fig. 1; Figs. 4 and 5 detail vertical sectional views taken on the lines IV—IV and V—V, respectively, Fig. 2; Fig. 6 a detail vertical sectional view taken on the line indicated by the section line VI, Fig. 1; Figs. 7, 8 and 9 enlarged detail views showing several steps in the cycle of operation of the machine in forming a loop; Fig. 10 a front view of the wire forming elements, the plane of view being indicated by the line X—X Fig. 8, Figs. 11, 12, and 13 plan views of different forms of looped wire fabric which may be manufactured by the machine; Fig. 14 a view similar to Fig. 2 showing a modification of construction; Fig. 15 a plan view of pin carriers showing a modification of construction; and Fig. 16 a sectional view taken on the line XVI—XVI, Fig. 15.

In machines of the general character disclosed herein two sets of pins, each set usually consisting of two pins, are mounted on pin carriers in such a manner that they may be moved horizontally on the carriers, and means are provided to move the carriers vertically in alternation. Cooperating with the sets of pins thus mounted for separate vertical and horizontal movements, means are provided to feed wire upon and bend it in loops around the pins. According to the present invention, a single wire engaging and bending member is provided to feed the wire upon and loop it around the pins, such member being movable toward and from each set of pins as well as transversely thereof. Above the pins, there is arranged means, preferably in the form of a die, for holding the loops of wire in their looped positions, both during and for a period after the formation of the loops.

The mechanism for effecting the several movements of the wire forming parts thus briefly described may assume a wide variety of forms. As far as concerns the movements of the pins, a number of forms of mechanism are well known, among which is that disclosed in my above mentioned patent. The mechanism of the entire machine may be conveniently divided into three parts, the first having to do with the construction and operation of the forming pins, the second with the construction and movements of the wire engaging and bending member, and the third with the die or equivalent means for holding the loops of wire in their looped positions. While in some respects there is some over-lapping in this division of the mechanism, the division is substantially correct and forms a convenient basis for describing the machine.

The entire machine may be mounted upon a suitable frame 1, and all of the operating parts be driven by a shaft 2 having its ends journaled in the frame. For rotating this shaft it may be provided with a pinion 3 meshing with a pinion 4 keyed to a shaft 5, which shaft may be provided with means such as a belt wheel 6 for driving it. Shaft 5 is also journaled in frame 1, and one of its ends may be provided with a hand wheel 7 for operating the machine slowly when setting it up or when starting the formation of a strip of looped wire.

Having reference now to the first of the above named divisions of the machine, namely, that having to do with the construction and operation of the forming pins, a set of pins 8 and 9 is mounted upon a pin carrier 10, which in turn, is supported by a block 11, and a similar set of pins 12 and 13 is mounted in a carrier 14 supported by a block 15. Each pin carrier is held yieldingly forwardly, that is to say, to the right as viewed in Figs. 1 and 2, by means of a spring, the carrier 10 by a spring 16, and the carrier 14 by a spring 17.

The blocks 11 and 15 supporting the pin carriers are mounted upon the upper ends of arms 18 and 19 adapted to move vertically in a housing 20. For so moving or reciprocating the arms in alternation, the lower end of arm 18 is provided with a roller 21 adapted to ride in a slot 22 formed in a cam 23 keyed to shaft 2, and arm 19 is similarly provided with a roller 24, engaged by a slot 25 formed in a cam 26 keyed to shaft 2.

Referring now to the second of the above named divisions of the machine, namely, the wire engaging and bending member and the mechanism for operating it, such member preferably takes the form of a finger 27 provided with a central bore 28 and secured to the end of a rod 29, also provided with a central bore 30 registering with the bore 28 of the finger. The outer end of bore 30 extends laterally to the face of rod 29 to receive a strand of wire 65 to be formed into looped fabric, the wire extending loosely through bores 28 and 30. Rod 29 is mounted for reciprocatory movement in a housing 31. To adjust the interior bearing surface of this housing to compensate for wear, the wall of the housing may be split longitudinally at one side as indicated at 32, Fig. 5, and bolts 33 may extend through the upper portion of the housing and engage threads below the split 32. To facilitate such adjustment, the opposite side of the housing may be weakened by a split 34 which does not extend entirely through the wall of the housing as does the split 32. Bolts 35, similar to bolts 33, may be provided for reenforcement of the housing at the split 34.

Means are provided for vertically adjusting the outer end of finger 27, and for this purpose the rear end of housing 31 is pivoted on the horizontally disposed pin 36 to a supporting block 37. Through suitable lugs 38 at the forward end of the housing there extend bolts 39 which have threaded engagement with block 37, and which are provided with locking nuts on opposite sides of the lugs, as seen in Figs. 4 and 5.

Block 37, upon which housing 31 is mounted, is pivoted on a vertical axis to frame 1 by means of a pin 40 for permitting horizontal movements of the finger 27 effected in a manner to be explained. To properly hold the block upon the frame during its horizontal swinging movement upon pin 40, a pin 41 extends through a slot 42 in frame 1 and engages the block.

Connections are provided between shaft 2 and finger 27 for reciprocating the latter twice during each rotation of shaft 2. These connections include a cam 43 keyed to shaft 2 and provided with a slot 44 which receives a roller 45 secured to the side of a pitman 46, which is forked at its inner end to straddle shaft 2 and thereby be held in its proper position. The outer end of pitman 46 is pivoted to a rocking lever 47, which in turn is pivoted as at 48 to a bracket 49 secured to the machine frame 1. Between the upper end of rocking lever 47 and the outer end of rod 29 there is a connecting link 50 pivoted to such members in the manner clearly seen in Fig. 2.

The lateral movements of block 37 are preferably effected by connections attached to the upper ends of the vertically reciprocable arms 18 and 19. These connections, as may be seen in Figs. 2 and 4, comprise pins 51 and 52 attached to and projecting laterally from arms 18 and 19, respectively, and provided with rollers 53 and 54 which bear against faces 55 and 56 at the forward end of block 37, which faces are inclined to the vertical as shown.

The third of the above mentioned divisions of the machine, namely, the die for holding the loops in looped position during and subsequent to their formation, is illustrated in Figs. 2, 3 and 10. A die 57, of a shape presently to be described, is mounted on the lower end of a shoe 58 provided with a projection 59 extending upwardly into a housing 60. The interior of the housing and the exterior of the projection are of angular form to prevent rotation of the die upon a vertical axis. While the weight of shoe 58 is usually sufficient to hold it downwardly in its operative position, it is preferred to provide a compression spring 61 to assist in this. This spring is arranged in housing 60 and bears at its lower end upon projection 59 and at its upper end against a follower 62 which bears against a set screw 63 for adjusting the compression of the spring. To hold the die in its proper position with relation to the forming pins, set screws 70 may be arranged one at each side of shoe 58, as seen in Fig. 3.

In Fig. 14, there is shown a modification of the position of the wire bending means. Instead of the horizontal arrangement of Fig. 2, the rod 29ª and finger 27ª are inclined upwardly by reason of the upward inclination of the rear portion of frame 1ª. This arrangement is advantageous in forming modified forms of looped wire fabric.

In Figs. 15 and 16 there is shown a modified form of pin carriers and their supporting blocks, in which the pin carriers are positively moved forwardly in their blocks after they have been forced rearwardly by finger 27. For this purpose, pin carriers 10ª and 14ª extend laterally to the sides of housing 20ª and their outer sides are provided with recesses 70 having inclined faces 71. Housing 20ª is provided with tongues 72 having faces 73 inclined in the same direction as faces 71. Pin carrier 14ª is indicated as being in its rearward position. When it moves downwardly, its inclined face 71 will be engaged by the inclined face 73 of tongue 72, with the result that the pin carrier is positively moved forwardly.

In describing the operation of the machine, the mechanical movements of the several parts will first be explained and thereafter the manner in which looped wire fabric is formed by such movements.

All of the moving parts of the machine are driven primarily by the rotating shaft 2. During each rotation of this shaft, arms 18 and 19 are each given a single reciprocation upwardly and downwardly. The slots 22 and 25 in cams 23 and 26 are so formed that for a brief interval both of the pin carriers will be in their upper position. In other words, pin carrier 14 is held in its upper position until after pin carrier 10 has reached such position, and pin carrier 10 is held in its upper position until after pin carrier 14 has reached such position. Slot 44 in cam 43 effects, through pitman 46, lever 47, link 50 and rod 29, two complete reciprocations of finger 27 during each rotation of shaft 2. Between each reciprocation of finger 27, such finger is caused to move laterally in one direction. When pin carrier 10 is lowered, arm 18, through pin 51 attached to such arm, and inclined face 55 formed on the end of block 37, causes such block to move to the left as viewed from the right hand side of the machine. In the same manner, after pin carrier 10 has been raised, the lowering of pin carrier 14 causes block 27 to move in the opposite direction. The forward movements of finger 27 effect the horizontal movements of pin carriers 10 and 14 against the resistance, respectively, of springs 16 and 17, the pin carrier being provided with a shoulder 64 adapted to engage the forward faces of one or the other of the pin carriers, depending upon the position of the finger.

In the operation of the machine constructed and adjusted as illustrated, particularly in Figs. 1, 2 and 3, looped wire fabric such as illustrated in Fig. 11 is formed. By spacing the forming pins in different positions upon the pin carriers and by the proper construction and adjustment of the other parts of the machine, various other forms of looped wire may be made, as, for example, such as illustrated in Figs. 12 and 13.

In describing the formation of looped wire fabric such as shown in Fig. 11, it will be assumed as a starting point that the initial loop of a strip has been formed by hand or by turning the hand wheel 7, and that the several forming elements are in their relative positions shown in Fig. 7 in which pin carrier 10 is in its lower forward position, pin carrier 14 in its upper rear position, and finger 27 in its forward position and to the left of the center line of the machine as viewed from the right of Fig. 1. In moving to the position indicated in Fig. 7, finger 27 has bent the wire 65 around pin 12 and into the shape shown in Fig. 7 above pin 8. Also it has moved pin carrier 14 rearwardly to feed rearwardly the formed strip. The first of these several parts to move is finger 27 which moves rearwardly to its full line position shown in Fig. 8, during which movement the form of the wire between pin 12 and above pin 8 is not changed because the wire, which is quite rigid, is loose in bores 28 and 30 of finger 27 and rod 29, and is held firmly upon pin 12 by a beveled edge 67 formed on the lower inner face of die 57, as seen in Fig. 10. After finger 27 has moved rearwardly, pin carrier 10 rises and pin 8 engages the loop formed above it. In the next step of the operation finger 27 moves from its full to its dotted line position shown in Fig. 8, thus bending the wire around pin 8. During this lateral movement of finger 27, pin carrier 14 moves downwardly, and, after its pins 12 and 13 have become disengaged from the loops, such pin carrier moves forwardly by reason of spring 17. After pin carrier 14 has been lowered and moved forwardly, finger 27 moves forwardly to the position indicated in Fig. 9 which shows the several parts in positions reverse to that shown in Fig. 7. There is thus completed a half cycle of the operation. The completion of the cycle is the reverse of that just explained, and will be readily understood.

It is characteristic of the machine that a single wire engaging and bending member is moved toward and from each of the sets of pins to loop wire around and in positions to be engaged by the pins, and that the loops thus formed are held upon the pins by the upper die both during and after their formation. Within the scope of the appended claims the mechanism for thus forming wire may be variously constructed.

I claim:

1. In a machine for making looped wire fabric, the combination with sets of forming pins separately movable both vertically and horizontally, of a wire-engaging and bending member mounted for reciprocatory movements to and from each of said sets of pins in alternation and for separate lateral movements transversely thereof, and coordinated driving connections for effecting said reciprocatory and lateral movements of said member.

2. In a machine for making fabricated wire, the combination with sets of forming pins separately movable both vertically and horizontally, of a housing mounted for movements transversely of said pins, a forming pin mounted in said housing for reciprocatory movements to and from said pins, and provided with a longitudinal wire-receiving bore, and means for effecting said transverse movements of said housing and said reciprocatory movements of said finger.

3. In a machine for making fabricated wire, the combination with a pair of vertically movable blocks, pin carriers mounted one on each of said blocks and movable horizontally thereon, yielding means for holding said carriers forwardly, a finger provided with a longitudinal bore through which wire is fed, and means for moving said finger toward and from each of said carriers in alternation and transversely thereof, said finger being provided with a shoulder adapted to engage the pin carriers and move them rearwardly against the resistance of said yielding means.

4. In a machine for making looped wire fabric, the combination of a pair of vertically movable arms each provided with forming pins, a frame, a housing mounted on said frame for movements transversely of said arms, a wire-engaging and forming member mounted for longitudinal movements to and from said arms, and means for moving said arms vertically, said housing transversely, and said forming member longitudinally to loop wire alternately around said pins.

5. In a machine for making looped wire fabric, the combination with sets of forming pins separately movable both vertically and horizontally, of a single wire-engaging member movable in sequence toward, from and transversely to each of said sets of pins to loop wire around the pins in alternation, and a die for engaging the sides of the formed loops and holding them in their looped forms while said member is moved from a set of pins.

6. In a machine for making looped wire fabric, the combination with sets of forming pins separately movable both vertically and horizontally, of a single wire-engaging member, means for reciprocating said member toward and from each set of pins, means for moving said member laterally after each reciprocatory movement thereof, and means for holding the loops of wire in their looped forms while said member is moved from a set of pins.

7. In a machine for making looped wire fabric, the combination of a pair of vertically movable arms each provided with forming pins, a wire engaging and bending member movable toward and from each of said arms, and means actuated by said arms for moving said member transversely of the arms.

8. In a machine for making looped wire fabric, the combination of a pair of vertically movable arms, each provided with forming pins, a movable support, a wire engaging and forming member mounted in said support for movement toward and from said arms, and means attached to said arms and engaging said support for moving the latter transversely of the arms.

9. In a machine for making looped wire fabric, the combination of a pair of vertically movable arms each provided with forming pins, a frame, a block mounted on said frame for movements transversely of said arms, a housing mounted upon and vertically adjustable with reference to said block, a wire-engaging and forming member mounted in said housing for movements toward and from said arms, and means for moving said arms vertically, said block transversely, and said member longitudinally to loop wire alternately around said pins.

10. In a machine for making looped wire fabric, the combination of a pair of arms each provided with forming pins, means for moving said arms vertically in alternation, a frame, a block pivotally mounted for oscillatory movement upon said frame transversely of said arms, a housing pivotally mounted for vertical adjustment upon said block, a rod mounted in said housing for longitudinal movement toward and from said arms, a wire-engaging and bending member at the end of said rod, means for moving said rod toward and from said arms, and means actuated by said arms for moving said block transversely.

11. In a machine for making looped wire fabric, the combination with sets of forming pins separately movable both vertically and horizontally, of a wire-engaging and bending member movable toward and from each of said sets of pins in alternation and movable transversely thereof, and a die arranged above said pins and having oppositely disposed inner faces shaped to engage the outside of loops formed upon said pins and to hold the wire in its looped form while said member is moved from a set of pins.

12. In a machine for making looped wire fabric, the combination of a pair of vertically movable arms each provided with forming pins, a housing mounted for movements transversely of said arms, a forming finger mounted in said housing for reciprocatory movements toward and from said arms and provided with a longitudinal wire-receiving bore, and means attached to said arms and engaging said housing for moving the latter transversely of the arms.

13. In a machine for making looped wire fabric, the combination of a pair of vertically movable arms each provided with horizontally movable forming pins, a housing mounted for movements transversely of said arms, a wire-engaging and forming finger mounted on said housing for reciprocatory movements toward and from said pins, coordinated means for reciprocating said arms and said finger, means attached to said arms and engaging said housing for moving the latter transversely of the arms, and a die arranged above said pins and having oppositely disposed inner faces shaped to engage the outside of loops formed upon said pins and to hold the wire in its looped form while said finger is moved from the pins.

In testimony whereof I affixed my signature in presence of two witnesses.

ALVAH A. GRINER.

Witnesses:
LILIAN BROCK,
STEWART L. WHITMAN.